US012694584B2

(12) United States Patent (10) Patent No.: US 12,694,584 B2
Wu et al. (45) Date of Patent: Jul. 28, 2026

(54) METHOD AND DEVICE FOR GENERATING HANDWRITING, COMPUTER DEVICE, AND READABLE MEDIUM

(71) Applicant: BOE TECHNOLOGY GROUP CO., LTD., Beijing (CN)

(72) Inventors: Yanhong Wu, Beijing (CN); Fengshuo Hu, Beijing (CN); Pengyu Liu, Beijing (CN); Xingchen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 212 days.

(21) Appl. No.: 18/564,070

(22) PCT Filed: Dec. 21, 2021

(86) PCT No.: PCT/CN2021/139985
§ 371 (c)(1),
(2) Date: Nov. 25, 2023

(87) PCT Pub. No.: WO2023/115312
PCT Pub. Date: Jun. 29, 2023

(65) Prior Publication Data
US 2024/0273787 A1      Aug. 15, 2024

(51) Int. Cl.
*G06V 30/32* (2022.01)
*G06T 11/23* (2026.01)
*G06V 30/142* (2022.01)

(52) U.S. Cl.
CPC .............. *G06T 11/23* (2026.01); *G06V 30/32* (2022.01); *G06V 30/1423* (2022.01)

(58) Field of Classification Search
CPC .. G06T 11/203; G06V 30/32; G06V 30/1423; G06F 3/048
See application file for complete search history.

(56) References Cited

U.S. PATENT DOCUMENTS 5,995,081 A * 11/1999 Kato ..................... G06T 11/203
345/174
12,353,651 B2 * 7/2025 Wu ..................... G06F 3/03545
(Continued)

FOREIGN PATENT DOCUMENTS

CN        102520849 A      6/2012
CN        102521858 A      6/2012
(Continued)

OTHER PUBLICATIONS

China Patent Office, First Office Action, Mar. 24, 2026, for corresponding CN application No. 202180004080.6.

*Primary Examiner* — John B Strege
(74) *Attorney, Agent, or Firm* — HOUTTEMAN LAW LLC

(57) ABSTRACT

The present disclosure provides a method for generating handwriting, belonging to the field of computer application technology. The handwriting generation method includes: acquiring sampling points on a handwritten track, and generating a handwritten track curve based on the sampling points wherein the handwritten track is a track of a stroke segment of a handwritten stroke; determining an arc length $\tau$ between interpolation points; determining positions of interpolation points on the handwritten track curve according to the arc length $\tau$ between interpolation points, where an arc length between two adjacent interpolation points on the handwritten track curve is the same as the arc length $\tau$ between interpolation points; and overlaying a handwriting effect parameter at the positions of the interpolation points to generate the track of the marker pen corresponding to the handwritten track curve.

19 Claims, 6 Drawing Sheets

(56) References Cited

U.S. PATENT DOCUMENTS

| | | | | |
|---|---|---|---|---|
| 2016/0132232 A1* | 5/2016 | Baba | .................. | G06F 3/04883 |
| | | | | 715/268 |
| 2021/0350122 A1* | 11/2021 | Dixon | .................. | G06V 30/36 |
| 2022/0121307 A1* | 4/2022 | Liu | .................... | G06F 3/04883 |
| 2022/0365670 A1* | 11/2022 | Jia | ........................ | G06V 30/226 |

FOREIGN PATENT DOCUMENTS

| | | | |
|---|---|---|---|
| CN | 102937849 A | 2/2013 |
| CN | 104123027 A | 10/2014 |
| CN | 107219941 A | 9/2017 |
| CN | 110599568 A | 12/2019 |
| CN | 111381754 A | 7/2020 |
| CN | 112102434 A | 12/2020 |
| CN | 113448486 A | 9/2021 |
| KR | 20210093193 A | 7/2021 |
| WO | 2014086264 A1 | 6/2014 |

* cited by examiner

FIG.4a                              FIG.4b

Calculating the t-value of each interpolation point on the handwritten track curve by using the Newton iterative algorithm    S31

Determining the positions of the interpolation points on the handwritten track curve through the Bezier curve algorithm according to the t-values of the interpolation points on the handwritten track curve    S32

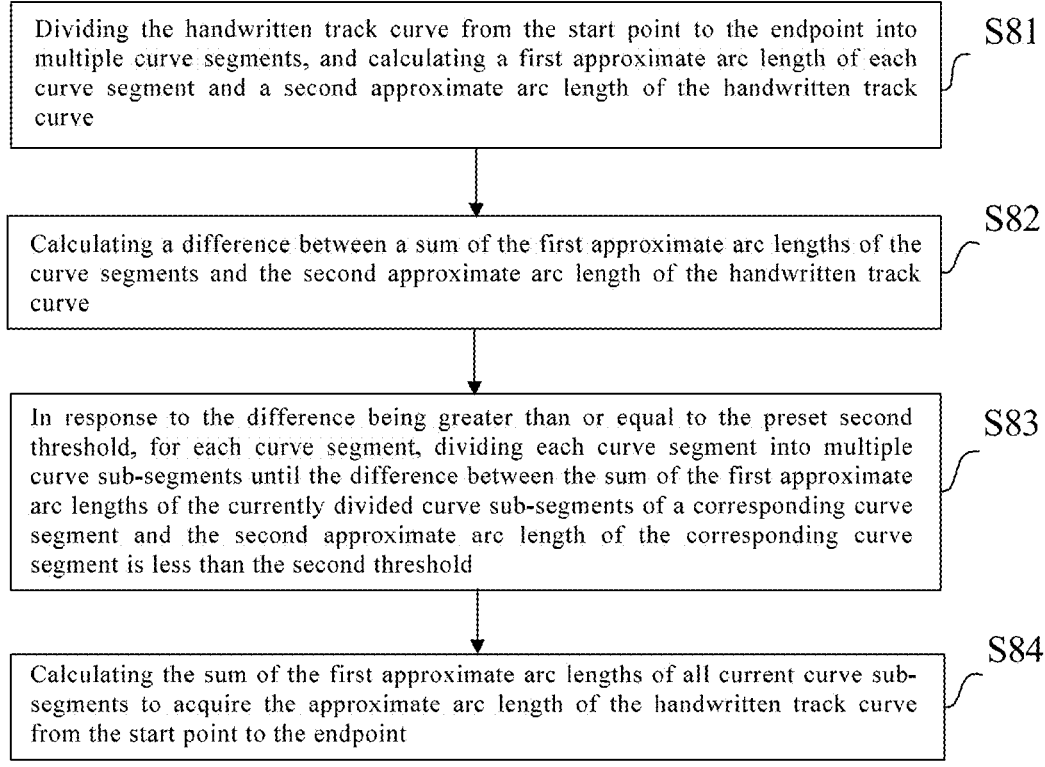

Dividing the handwritten track curve from the start point to the endpoint into multiple curve segments, and calculating a first approximate arc length of each curve segment and a second approximate arc length of the handwritten track curve    S81

Calculating a difference between a sum of the first approximate arc lengths of the curve segments and the second approximate arc length of the handwritten track curve    S82

In response to the difference being greater than or equal to the preset second threshold, for each curve segment, dividing each curve segment into multiple curve sub-segments until the difference between the sum of the first approximate arc lengths of the currently divided curve sub-segments of a corresponding curve segment and the second approximate arc length of the corresponding curve segment is less than the second threshold    S83

Calculating the sum of the first approximate arc lengths of all current curve sub-segments to acquire the approximate arc length of the handwritten track curve from the start point to the endpoint    S84

FIG.8

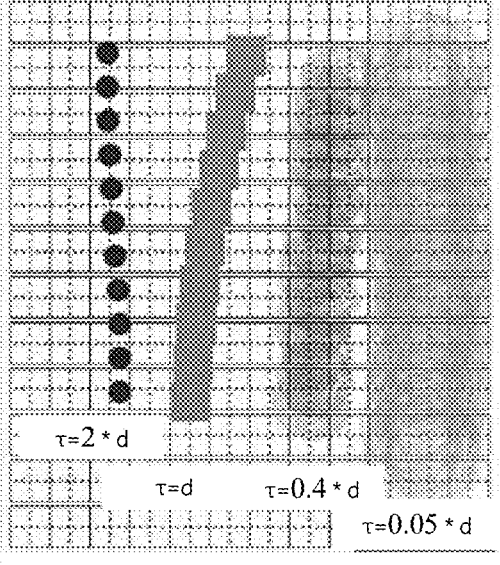

$\tau=2 * d$ $\tau=d$     $\tau=0.4 * d$ $\tau=0.05 * d$

FIG.9

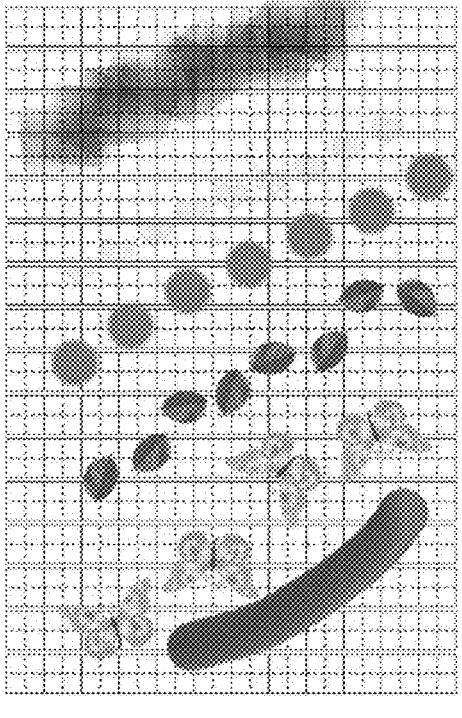
FIG.10
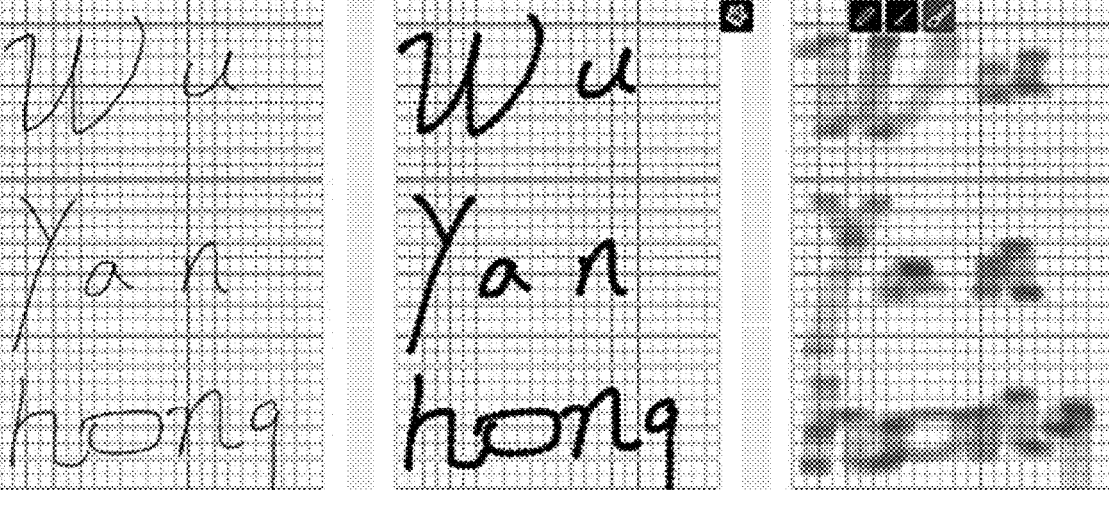
FIG.11a                    FIG.11b                    FIG.11c

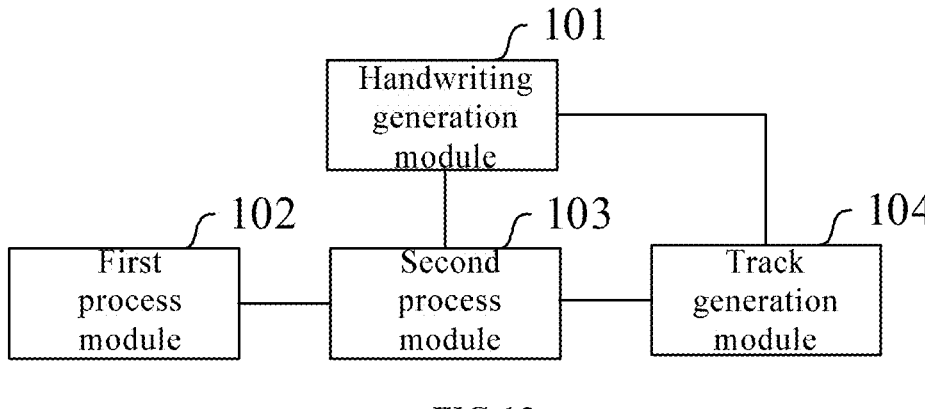
FIG.12
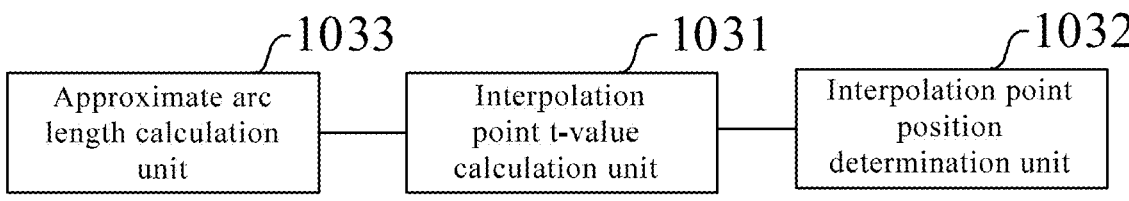
FIG.13
FIG.14

METHOD AND DEVICE FOR GENERATING HANDWRITING, COMPUTER DEVICE, AND READABLE MEDIUM

TECHNICAL FIELD

The present disclosure relates to the technical field of computer application and in particular, to a method and a device for generating handwriting, a computer device, and a readable medium.

BACKGROUND

In fields such as smart education, business office, and smart healthcare, devices such as electronic interactive whiteboards, as convenient tools, play an extremely important role in information exchange and sharing. However, the generation effect of handwritten track of the devices affects the user experience of the product.

Since the handwritten of a marker pen is transparent, a text can be seen when the track of the marker pen covers the text, therefore the marker pen is widely used in marking key content and other aspects. At present, in the handwriting generation scheme, the presentation effect described above of the handwriting of the marker pen cannot be realized yet.

SUMMARY

In order to solve at least one of the technical problems existing in the prior art, the present disclosure provide a method and a device for generating handwriting having an effect of a marker pen, a computer device, and a readable medium.

As a first aspect, an embodiment of the present disclosure provides a method for generating handwriting, configured to generate a track of a marker pen according to a handwritten stroke, and the track of the marker pen including at least one track segment, wherein each of the at least one track segment is generated by: acquiring sampling points on a handwritten track, and generating a handwritten track curve based on the sampling points, wherein the handwritten track is a track of a stroke segment of a handwritten stroke; determining an arc length $\tau$ between interpolation points; determining positions of interpolation points on the handwritten track curve according to the arc length $\tau$ between interpolation points, where an arc length between two adjacent interpolation points on the handwritten track curve is the same as the arc length $\tau$ between interpolation points; and overlaying a handwriting effect parameter at the positions of the interpolation points to generate the track of the marker pen corresponding to the handwritten track curve.

As a second aspect, an embodiment of the present disclosure provides a handwriting generation device configured to generate a track of a marker pen based on a handwritten stroke, the track of the marker pen includes at least one track segment, and the handwriting generation device comprises a handwriting generation module, a first process module, a second process module, and a track generation module; the handwriting generation module is configured to acquire sampling points on a handwritten track and generate a handwritten track curve based on the sampling points, wherein the handwritten track is a track of a stroke segment in the handwritten stroke; the first process module is configured to determine an arc length $\tau$ between interpolation points; the second process module is configured to determine positions of the interpolation points on the handwritten track curve according to the arc length $\tau$ between interpolation points, wherein the arc length between two adjacent interpolation points on the handwritten track curve is the same as the arc length $\tau$ between interpolation points; the track generation module is configured to overlay a handwriting effect parameter at the positions of the interpolation points to generate the track of the marker pen corresponding to the handwritten track curve.

As a third aspect, an embodiment of the present disclosure provides a computer device, including: one or more processors; a storage device on which one or more programs are stored; the one or more programs, when being run by the one or more processors, are configured to cause the one or more processor to perform the method for generating handwriting described above.

As a fourth aspect, an embodiment of the present disclosure provides a computer-readable medium on which a computer program is stored, wherein the program is executed to implement the method for generating handwriting described above.

BRIEF DESCRIPTION OF DRAWINGS

FIG. 4a is a schematic diagram showing an unequal arc length interpolation in related art;

FIG. 4b is a schematic diagram showing an equal arc length interpolation according to an embodiment of the present disclosure;

FIG. 8 is a flowchart showing calculation of an approximate arc length $L(1)$ of a handwritten track curve according to an embodiment of the present disclosure;

FIG. 9 is a schematic diagram showing a presentation effect of various brush parameters according to an embodiment of the present disclosure;

FIG. 10 is a schematic diagram showing a presentation effect of various handwriting effect parameters according to an embodiment of the present disclosure;

FIG. 11a is a schematic diagram showing a handwritten track according to an embodiment of the present disclosure;

FIG. 11b is a schematic diagram showing a handwritten track formed according to the equal arc length interpolation without the handwriting effect parameters applied;

FIG. 11c is a schematic diagram showing a display effect of a handwritten track of a marker pen with transparency applied;

FIG. 12 is a schematic diagram showing a structure of a handwriting generation device according to an embodiment of the present disclosure;

FIG. 13 is a schematic diagram showing a structure of a second process module according to an embodiment of the present disclosure; and FIG. 14 is a schematic diagram showing a structure of the second process module according to an embodiment of the present disclosure.

DETAIL DESCRIPTION OF EMBODIMENTS

In order to enable technical personnel in this field to better understand the technical solution of the present disclosure, the following will provide a further detailed description of the present disclosure/utility model in conjunction with the accompanying drawings and embodiments.

Unless otherwise defined, technical or scientific terms used in this disclosure shall have the usual meaning understood by individuals with general skills in the field to which this disclosure belongs. The terms "first", "second", and similar terms used in this disclosure do not indicate any order, quantity, or importance, but are only used to distinguish different components. Similarly, similar words such as "one", "one", or "the" do not indicate a quantity limit, but rather indicate the existence of at least one. Words such as "include" or "comprise" refer to the components or objects that appear before the word, including the components or objects listed after the word and their equivalents, without excluding other components or objects. Words such as "connect" or "couple" are not limited to physical or mechanical connections, but can include electrical connections, whether direct or indirect. The terms "up", "down", "left", "right", etc., are only used to represent relative positional relationships. When the absolute position of the described object changes, the relative positional relationship may change accordingly.

Figure 1:
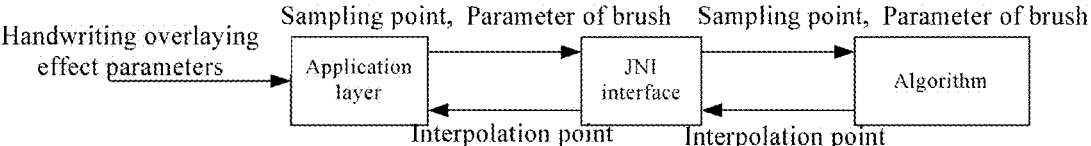
FIG. 1 is a schematic diagram showing a software architecture according to an embodiment of the present disclosure.

An embodiment of the present disclosure provides a handwriting generation method, which is applied to a handwriting generation device, and the handwriting generation device is a functional module of a terminal device. FIG. 1 is a schematic diagram showing a software architecture according to an embodiment of the present disclosure. As shown in FIG. 1, the terminal device obtains the handwriting effect parameters through an application layer module. After the application layer module obtains sampling points on a handwritten track and brush parameters, the application layer sends the sampling points on the handwritten track and the brush parameters to an algorithm module through a Java Native Interface (i.e., JNI interface). After the algorithm module generates the handwritten track curve and determines a position of an interpolation point on the handwritten track curve, the algorithm module sends the position of the interpolation point to the application layer module through the JNI interface. The application layer module generates a track of the marker pen corresponding to the handwritten track curve. In the embodiment of the present disclosure, the terminal device has a display function, which includes but not limited to a touch function. For example, the terminal device may be a large-sized (generally over 50 inches) intelligent touch display device such as a conference whiteboard and a teaching whiteboard. By manually marking the text, images, tables, and other contents on the terminal device, various marker styles in different shapes, colors, thicknesses, and transparencies may be presented, thereby achieving overlay effects in transparency, stroke width, pattern, color, and other aspects.

Figure 2:
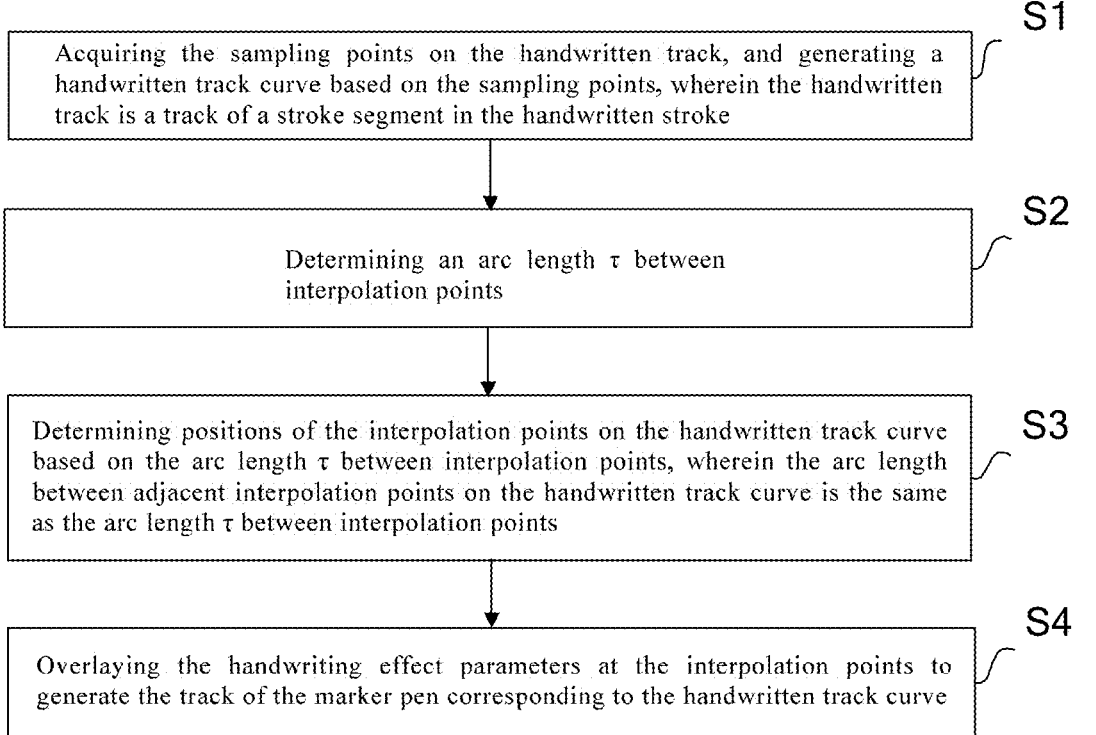
FIG. 2 is a flowchart showing a handwriting generation method according to an embodiment of the present disclosure.

The handwriting generation method in the embodiment of the present disclosure is configured to generate the handwritten track of a marker pen based on the handwritten stroke. The handwritten track of the marker pen includes at least one track segment, wherein each of the track segment may be generated through the steps shown in FIG. 2. As shown in FIG. 2, the method for generating the track segment includes steps S1 to S4.

At step 1, acquiring sampling points on a handwritten track, and generating a handwritten track curve based on the sampling points, wherein the handwritten track is a track of a stroke segment in the handwritten stroke.

A handwritten stroke is a touch track of a user on the touch screen of the terminal device. In the step, sparse sampling is performed on the stroke segment of the handwritten stroke to acquire the sampling points, and the handwritten track curve of the stroke segment is generated based on the sampling points.

It should be noted that the handwritten track curve may also be a preset track curve for handwritten smoothing, such as a Bezier curve. However, in a specific process for rendering the handwritten stroke, it is necessary to acquire sampling points to form a specific handwritten track curve. For example, a specific Bezier curve may be generated according to the acquired sampling points as the control points on Bezier curve. However, it should be noted that the specific Bezier curve generated is not necessarily displayed on the screen, but used for subsequent calculation of interpolation points.

At step 2, determining an arc length $\tau$ between interpolation points.

The arc length $\tau$ between interpolation points is an arc length between two adjacent interpolation points on the handwritten track curve. For the first interpolation point, the arc length $\tau$ between interpolation points is an arc length between a first interpolation point and a first sampling point on the handwritten track curve.

At step 3, determining positions of the interpolation points on the handwritten track curve based on the arc length $\tau$ between interpolation points, wherein the arc length between adjacent interpolation points on the handwritten track curve is the same as the arc length $\tau$ between interpolation points.

In the embodiment of the present disclosure, the equal arc length interpolation is applied to the handwritten track curve, such that the arc lengths each between two adjacent interpolation points on the handwritten track curve after interpolation are the same as each other. It should be noted that the same arc length may be understood as the arc lengths each between the interpolation points $\tau$ are substantially the same. Considering that absolute equality is an ideal state, and subsequent arc length calculations involve approximation, arc length convergence, and iterative calculation methods, the so-called equal arc length interpolation herein has an error in arc length within a certain range instead of absolute equal arc lengths. In some embodiments, the range of the error is 20% or 30%.

At step 4, overlaying the handwriting effect parameters at the interpolation points to generate the track of the marker pen corresponding to the handwritten track curve.

In the step, the position of the interpolation points on the handwritten track curve is overlaid with handwriting effect parameters to achieve the presentation of a marker pen effect of the handwritten track. The handwriting effect parameters can be pre-set in the application layer module of the terminal device for users to choose from. By overlaying different types of handwriting effect parameters, different display effects of marker pen strokes can be presented.

In some embodiments, due to the characteristics of the marker pen, the handwritten track generated from the marker pen has a certain degree of transparency which may achieve marking of the content without affecting the presentation of the marked content. The handwriting effect parameter includes transparency. The handwriting effect parameter such as transparency is overlaid on the positions of the interpolation points, thereby increasing the transparency of the marker pen strokes at the positions. For example, the transparency of the marker pen strokes without the handwriting effect parameter overlaid is 20%, and the transparency of the marker pen strokes with the handwriting effect parameter overlaid increases to 40%. It should be noted that the handwriting effect parameters may be linearly or non-linearly superimposed on the interpolation points.

In some embodiments, the handwriting effect parameters may include at least one of color, thickness, and pattern. FIG. 10 shows the overlapping effects of various strokes with different thicknesses, colors, and patterns, such as peach hearts, leaves, butterflies, and rainbows.

In some embodiments, step 1 of generating a handwritten track curve according to the sampling points may include: generating a handwritten track curve according to the Bezier curve algorithm. Correspondingly, step 3 of determining positions of the interpolation points on the handwritten track curve includes: determining the positions of the interpolation points on the handwritten track curve through an iterative algorithm.

Bezier curve is widely used in graphic design and path planning. The curve shape of the Bezier curve is determined by control points. The $(n-1)$th order Bezier curve is generated based on N control points through a recursion algorithm.

Figure 3:
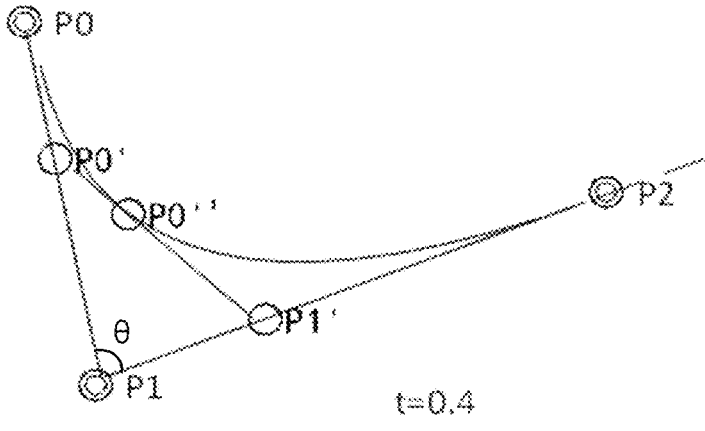
FIG. 3 is a schematic diagram showing generation of a second-order Bezier curve according to an embodiment of the present disclosure.

Taking the second-order Bezier curve as an example, as shown in FIG. 3, the second-order Bezier curve has three non-collinear control points P0, P1, and P2, and the second-order Bezier curve is based on formula (1):

$$C_2(t) = (1-t)^2 P_0 + 2t(1-t)P_1 + t^2 P_2 \qquad (1)$$

wherein $C_2$ is P0'', t is the parameter scale of Bezier curve, $t \in [0,1]$.

In the embodiment of the present disclosure, the handwritten track curve is generated according to the second-order Bezier curve algorithm, and the application layer module sends three sampling points as control points to the algorithm module each time through the JNI interface.

In some embodiments, step 1 of acquiring the sampling points on the handwritten track, and generating a handwritten track curve based on the sampling points, includes: acquiring three sampling points on the handwritten track, and generating the handwritten track curve according to the three sampling points by using the Bezier curve algorithm, wherein the middle sampling point is the vertex, and the connection lines each connecting the middle sampling point to the two adjacent sampling points are two sides, with an included angle formed between the two sides, that is, the three sampling points are not collinear.

In the case where a first included angle is greater than a second included angle, the number of interpolation points on the first handwritten track curve is greater than the number of interpolation points on the second handwritten track curve. The first handwritten track curve is the handwritten track curve generated through the Bezier curve algorithm according to the three sampling points in the first group. The first included angle is the included angle between the connection lines as two sides each connecting the middle sampling point, which serves as a vertex, to the two adjacent sampling points in the first group which are adjacent to the middle sampling point. The second hand written track curve is a handwritten track curve generated through the Bezier curve algorithm according to the three sampling points in the second group, and the second included angle is the included angle between the connection lines as two sides each connecting the middle sampling point, which serves as a vertex, to the two adjacent sampling points in the second group which are adjacent to the middle sampling point.

As shown in FIG. 3, for the second-order Bezier curve, the three sampling points are P0, P1 and P2 respectively, P1 serves as the vertex, P0P1 and P2P1 serve as sides, and the included angle $\theta$ between P0P1 and P2P1 is formed. The larger the included angle $\theta$, the longer the arc length of the second-order Bezier curve, the more interpolation points on the arc length selected.

After the handwritten track curve is generated through the Bezier curve algorithm, according to the method in the field, the t-value is extracted from 0 to 1 in an equal difference manner (that is, the difference between the t-values corresponding to two adjacent interpolation points is equal). The interpolation points acquired are shown in FIG. 4a. The interpolation points are unevenly distributed on the handwritten track curve. The interpolation points are densely distributed at the position where the handwritten track curve bends, while the interpolation points are sparsely distributed in the gentle portion of the handwritten track curve. In the case of small curvature radius, the curvature of the handwritten track curve is relatively large, and multiple interpolation points at the turning point of the handwritten track curve will almost overlap. After the handwriting effect parameters are applied, the color of the acquired handwritten track curve at the turning point quickly deepens, resulting in uneven color of the entire handwritten track curve, poor reality and poor presentation effect of the handwritten track curve. The present disclosure aims to acquire the interpolation points uniformly distributed on the handwritten track curve, as shown in FIG. 4b. The interpolation points are evenly distributed throughout the entire handwritten track curve, which can avoid the occurrence of multiple interpolation points overlapping at the turning point of the handwritten track curve in case of a small curvature radius. After the handwriting effect parameters are added, the color of the acquired handwritten track curve at the turning point is deepened to a certain extent but not too deep compared to the color of the gentle portion of the handwritten track curve. The reality of handwritten track curve is better, thereby improving the presentation effect.

According to the handwriting generation method in the embodiment of the present disclosure, the equal arc length interpolation is applied to the handwritten track curve corresponding to one stroke segment in a handwritten stroke. The arc length between adjacent interpolation points is the same. After the handwriting effect parameters are applied on the interpolation points, the handwritten track of the marker pen corresponding to the handwritten track curve may be generated, thereby enriching the presentation effect of handwriting. Moreover, the track of the marker pen can present an overlay effect of the handwritten track while transparently displaying the covered content, that is, to achieve the effect of overlapping the handwriting effect parameters of different strokes at a position where the different strokes overlay each other. For example, the color of the strokes at the overlapping position of the strokes is darker than the color of the strokes at the non-overlapping position, and the rendering effect of the strokes of the marker pen is more realistic.

In some embodiments, the iterative algorithm is a Newton-Raphson algorithm. The embodiments of the present disclosure will be illustrated by taking the Newton iterative algorithm (i.e., Newton-Raphson algorithm) as an example.

Figure 5:
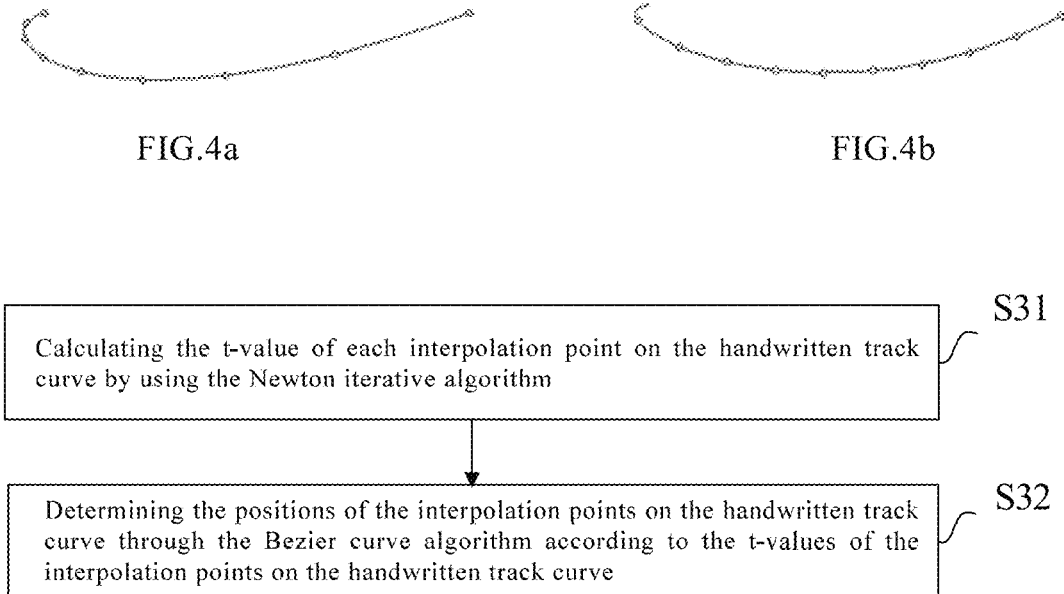
FIG. 5 is a flowchart showing determination of a position of an interpolation point on a handwritten track curve according to an embodiment of the present disclosure.

In some embodiments, as shown in FIG. 5, step 3 of determining the positions of interpolation points on the handwritten track curve according to the arc length $\tau$ between interpolation points, includes:

At Step 31, calculating the t-value of each interpolation point on the handwritten track curve by using the Newton iterative algorithm.

In the step, for each interpolation point, the approximate arc length $L(t_{j+1})$ on the handwritten track curve corresponding to the iterative value $t_{j+1}$ of t-value converges with respect to the arc length S from the interpolation point to the first sampling point on the handwritten track curve, where (j+1) is the current number of iterations, $1 \leq (j+1) \leq N$, and N is the preset maximum number of iterations. That is to say, the convergence condition of the Newton iterative algorithm is: $L(t_{j+1}) \approx S$, wherein, S is a multiple of the arc length $\tau$ between interpolation points. For example, the arc length S between the first interpolation point and the first sampling point on the handwritten track curve follows: $S=\tau$, the arc length S between the second interpolation point and the first sampling point on the handwritten track curve follows: $S=2\tau$, and the arc length S between the third interpolation point and the first sampling point on the handwritten track curve follows: $S=3\tau$, and so on.

According to the above method, the t-value for each interpolation point on the handwritten track curve can be calculated respectively, and those t-values are the t-values acquired according to the equal arc length interpolation that meets the convergence condition.

At Step 32, determining the positions of the interpolation points on the handwritten track curve through the Bezier curve algorithm according to the t-values of the interpolation points on the handwritten track curve.

In the step, the t-value (i.e., converged t-value) of each interpolation point calculated in step 31 is brought into the formula of the second-order Bezier curve, that is, formula (1), to obtain the position of the interpolation point on the handwritten track curve corresponding to the t-value.

In some embodiments, before step 31 of calculating, by using the Newton iterative algorithm, the t-value of each interpolation point on the handwritten track curve for each interpolation point, the handwriting generation method may further include: calculating the approximate arc length L(1) of the handwritten track curve. The handwritten track of the marker pen corresponds to the handwritten stroke and includes at least one track segment. Correspondingly, the handwritten stroke also includes at least one stroke segment. The track segments of the marker pen are generated one by one, and the stroke segments are in one-to-one correspondence with the track segments. The approximate arc length L(1) of the handwritten track curve is a total arc length of the handwritten track curve of the current track segment, which is an arc length of the handwritten track curve of the current track segment corresponding to t=1.

Correspondingly, for each interpolation point, step 31 of calculating, based on the Newton iterative algorithm, the t-value for the interpolation point of each interpolation point on the handwritten track curve includes: for each interpolation point, within the approximate arc length L(1) of the handwritten track curve, calculating, based on the Newton iterative algorithm, the t-value of each interpolation point on the handwritten track curve.

Figure 6:
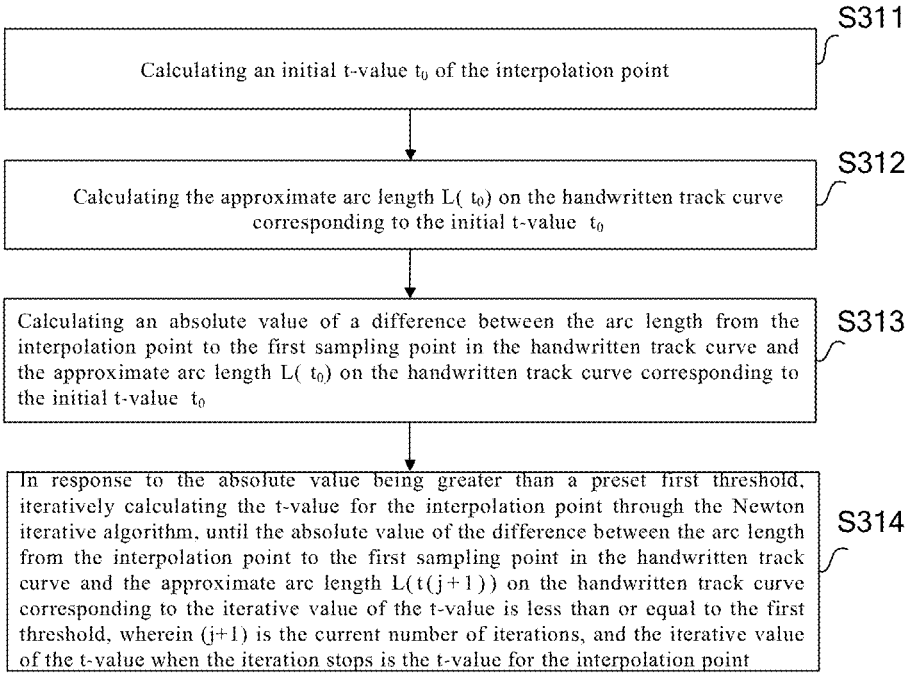
FIG. 6 is a flowchart showing calculation of a t-value of an interpolation point on a handwritten track curve according to an embodiment of the present disclosure.

In some embodiments, as shown in FIG. 6, calculating the t-value of each interpolation point on the handwritten track curve includes steps 311 to 314.

At step 311, calculating an initial t-value $t_0$ of the interpolation point.

In general, due to the natures of the Bezier curve, no steep curve between the two interpolation points exists. The number of interpolation points may be increased to ensure the smoothness of the handwritten track curve between the two interpolation points. Therefore, it can be considered that the t-value is closer to a ratio of S to the approximate arc length L(1) of the handwritten track curve. Therefore, in some embodiments, the initial t-value for the interpolation point can be calculated by formula (2), thereby realizing computation reduction:

$$t_0 = \frac{S}{L(1)} \qquad (2)$$

wherein L(1) is the approximate arc length of the handwritten track curve.

At step 312, calculating the approximate arc length $L(t_0)$ on the handwritten track curve corresponding to the initial t-value to.

At step 313, calculating an absolute value of a difference between the arc length S from the interpolation point to the first sampling point in the handwritten track curve and the approximate arc length $L(t_0)$ on the handwritten track curve corresponding to the initial t-value to.

In the step, $\Delta = |S - L(t_0)|$ is calculated. The absolute value can reflect the accuracy of the t-value. The smaller the absolute value, the more accurate the t-value. In some embodiments, $\Delta$ is 0.0001 pixel.

At step 314, in response to the absolute value being greater than a preset first threshold, iteratively calculating the t-value for the interpolation point through the Newton iterative algorithm, until the absolute value of the difference between the arc length S from the interpolation point to the first sampling point in the handwritten track curve and the approximate arc length $L(t_{j+1})$ on the handwritten track curve corresponding to the iterative value $t_{j+1}$ of the t-value is less than or equal to the first threshold, wherein (j+1) is the current number of iterations, and the iterative value $t_{j+1}$ of the t-value at the time of stopping the iteration is the t-value for the interpolation point.

In the step, if the absolute value is greater than the first threshold, which indicates that the current t-value is inaccurate and the equal arc length interpolation cannot be realized based on the t-value. Therefore, it is necessary to iteratively calculate the t-value by using the Newton iterative algorithm. If the absolute value is less than or equal to the first threshold, which indicates that the current t-value is accurate and the equal arc length interpolation can be realized based on the t-value without the need for iterative calculation.

The relationship between the curve arc length L of the second-order Bezier curve and t-value may be calculated as follows:

Assuming $0=a=t_1 < t_2 < t_3 < \ldots < t_m = b = t$ and m is the total number of t, the arc length of the handwritten track curve may be approximated according to a sum of distances between discrete points in intervals, and formula (3) is:

$$L \approx \sum_{j=1}^{m-1} |C(t_{j+1}) - C(t_j)| \qquad (3)$$

According to the mean value theorem, formula (3) is deformed to acquire formula (4):

$$L \approx \sum_{j=1}^{m-1} |C'(t_j^*)|(t_{j+1} - t_j) \qquad (4)$$

where $$t_j^*$$

is a value in interval $[t_j, t_{j+1}]$, $$|C'(t_j^*)|$$

is a length of a point $$C'(t_j^*)$$

on the first derivative of the handwritten track curve.

When $t_{j+1} - t_j \to 0$, the approximate relationship between the approximate arc length L of the handwritten track curve and t follows formula (5):

$$L(t) \approx \int_0^t |C'(u)| du \qquad (5)$$

Since the integral function of formula (5) cannot directly calculate the inverse function thereof, that is, given L=S, the t-value cannot be calculated. The position of the interpolation points on the handwritten track curve in a case of the arc length L=S may only be finally determined according to the t-value, so the root of equation (10) needs to be solved:

$$L(t) - S = 0 \qquad (6)$$

The principle of Newton's iterative algorithm is as follows: making a tangent at an initial point based on the position (i.e., the coordinates) of the initial point; intersecting the tangent with the X-axis to acquire the position of the next iteration point, and making a tangent at the intersection position, and so on, until an approximate solution that meets the accuracy requirements is acquired.

In the embodiment of the present disclosure, according to equation (6), let f(t)=L(t)−S, the first derivative of f(t) is f'(t), the iterative equation is formula (7):

$$t_{j+1} = t_j - \frac{f(t_j)}{f'(t_j)} \qquad (7)$$

The calculated $t_{j+1}$ as $t_j$ for the next iteration substitute is placed to formula (7) for calculation, and the root of f(t) can be obtained after several iterations. Among them, j+1) is the current number of iterations, 1≤(j+1)≤N, and N is the preset maximum number of iterations. f'(t)=L'(t)=|C'(t)|, C'(t) is the first derivative of the second-order Bezier curve, which can be calculated by taking the derivative of formula (1). Formula (8) of the first derivative of the second-order Bezier curve is as follows:

$$C_2'(t) = 2((1 - t)(P_1 - P_0) + t(P_2 - P_1)) \qquad (8)$$

It should be noted that the derivative of Bezier curve is the derivative of coordinate point to t, which includes two dimensions of x and y for derivation. When calculating the derivative of arc length, it is necessary to convert from x and y to the arc length for derivation.

Figure 7:
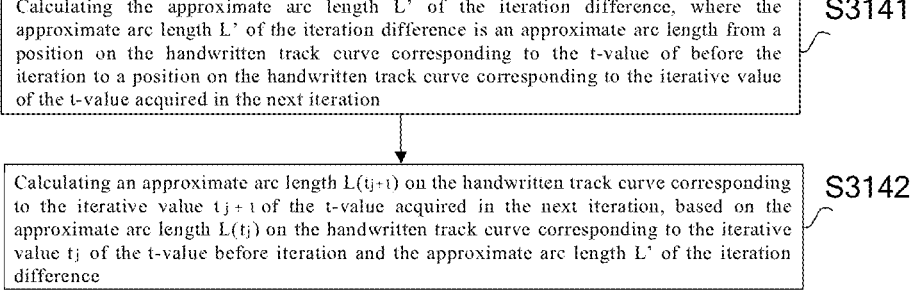
FIG. 7 is a flowchart showing calculation of an approximate arc length $L(t_{j+1})$ on a handwritten track curve corresponding to an iterative value $t_{j+1}$ of a t-value according to an embodiment of the present disclosure.

In some embodiments, as shown in FIG. 7, the step 314 of calculating the approximate arc length $L(t_{j+1})$ on the handwritten track curve corresponding to the iterative value $t_{j+1}$ of the t-value may include steps 3141 and 3142.

At step 3141, calculating the approximate arc length L' of the iteration difference, where the approximate arc length L' of the iteration difference is an approximate arc length from a position on the handwritten track curve corresponding to the t-value of $t_j$ before the iteration to a position on the handwritten track curve corresponding to the iterative value $t_{j+1}$ of the t-value acquired in the next iteration.

At step 3142, calculating an approximate arc length $L(t_{j+1})$ on the handwritten track curve corresponding to the iterative value $t_{j+1}$ of the t-value acquired in the next iteration, based on the approximate arc length $L(t_{j+1})$ on the handwritten track curve corresponding to the iterative value $t_{j+1}$ of the t-value before iteration and the approximate arc length L' of the iteration difference.

For example, assuming that in the process of calculating the t-value of the current interpolation point to be interpolated, the t-value acquired when the fifth iteration (i.e., the iteration for the fifth time) stops is $t_5$, that is, j+1=5. The t-value acquired when fourth iterative stops is $t_4$, where $t_5$ corresponds to position $A_5$ on the handwritten track curve, and $t_4$ corresponds to position $A_4$ on the handwritten track curve, and the first sampling point on the handwritten track curve is O. When calculating the approximate arc length $L(t_5)$ on the handwritten track curve corresponding to $t_5$, since $L(t_5)=OA_5$, the arc length $A_5A_4$ from $A_5$ to $A_4$ of the iteration difference can be calculated first of all, that is, L'=$A_5A_4$. $L(t_5)=OA_5=OA_4 \pm A_5A_4=L(t_4) \pm L'$, since $OA_4$=L $(t_4)$ and $L(t_4)$ has already been calculated during the iterative calculation of $t_4$, the value of $L(t_4)$ may be directly acquired and summed with L' to acquire the approximate arc length $L(t_5)$ on the handwritten track curve corresponding to $t_5$. The solution for calculating the approximate arc length $L(t_{j+1})$ on the handwritten track curve corresponding to the iterative value $t_{j+1}$ of the t-value does not require repeated calculations, which can save computational power and improve processing speed.

It should be noted that in the process of calculating the t-values of each interpolation point after the second interpolation point on the handwritten track curve according to steps 311 to 314, taking the calculation of the t-value of the second interpolation point as an example, at step 312, the approximate arc length on the handwritten track curve corresponding to the initial t-value of the second interpolation point may be calculated summing the arc length on the handwritten track curve from a position corresponding to the initial t-value of the first interpolation point to a position corresponding to the initial t-value of the second interpolation point and the calculated arc length from the first sampling point to the first interpolation point on the handwritten track curve, which can decrease computational amount.

It should be noted that for the Bezier curve, there is no analytical solution for the definite integral of formula (5), which needs to be solved by numerical integration. Therefore, for the handwritten track curve generated according to the Bezier curve algorithm, only the approximate arc length can be acquired instead of an exact arc length.

In some embodiments, the calculation of the approximate arc length may include: determining the t-value for the start point and the t-value for the endpoint of the handwritten track curve corresponding to the approximate arc length; and calculating the approximate arc length through the Simpson 3/8 algorithm based on the t-value for the start point and the t-value for the endpoint.

In the embodiment of the present disclosure, the approximate arc length includes: the approximate arc length $L(1)$ of the handwritten track curve, the approximate arc length $L(t_{j+1})$ on the handwritten track curve corresponding to the iterative value $t_{j+1}$ of the t-value, the approximate arc length $L(t_0)$ on the handwritten track curve corresponding to the initial t-value $t_0$, and the approximate arc length $L'$ of the iteration difference.

When the approximate arc length is the approximate arc length $L(1)$ on the handwritten track curve, the t-value for the start point is 0, and the t-value for the endpoint is 1. When the approximate arc length is the approximate arc length $L(t_{j+1})$ on the handwritten track curve corresponding to the iterative value $t_{j+1}$ of t-value, the t-value for the start point is 0, and the t-value for the endpoint is the iterative value $t_{j+1}$ of t-value. When the approximate arc length is the approximate arc length $L(t_0)$ on the handwritten track curve corresponding to the initial t-value $t_0$, the t-value for the start point is 0, and the t-value for the endpoint is the initial t-value to. When the approximate arc length is the approximate arc length $L'$ of the iteration difference, the t-value for the start point is the t-value before iteration $t_j$, the t-value for the endpoint is the iterative value $t_{j+1}$ of the t-value acquired in the next iteration.

For Bezier curve, the definite integral of the approximate relationship (i.e., formula (5)) between the approximate arc length L of the handwritten track curve and t-value has no analytical solution and needs to be solved by numerical integration. For Bezier curve, the arc length of Bezier curve may be acquired by integrating the derivative f (x) of the arc length, and the derivative of arc length of Bezier curve may be converted from the derivative of Bezier curve.

In some embodiments, the curves to be integrated (i.e. f(x)) may be approximated as a cubic curve by using the Simpson3/8 algorithm: $f(x)=a_0+a_1x+a_2x^2+a_3x^3$, the integral value of f(x) may be approximated as:

$$I = \int_a^b f(x)dx \approx (b-a) \times \frac{f(x_0) + 3f(x_1) + 3f(x_2) + f(x_3)}{8},$$

$$\text{where } x_0 = a, \, x_1 = a + \frac{b-a}{3}, \, x_2 = a + \frac{2(b-a)}{3}, \, x_3 = b.$$

It should be noted that due to the arbitrariness of the handwritten track curve, for a given t-value, an approximate arc length L(t) corresponding to the given t-value needs to be calculated by approximately summing multiple curve segments divided according to the Simpson algorithm.

Therefore, the embodiment of the present disclosure adopts the idea of recursive integration to dynamically segment the handwritten track curve.

The process of calculating for example the approximate arc length of the handwritten track curve by using the Simpson algorithm will be illustrated in detail in conjunction with FIG. 8.

In some embodiments, as shown in FIG. 8, calculating the approximate arc length of the handwritten track curve may include steps 81 to 84.

At step 81, dividing the handwritten track curve from the start point to the endpoint into multiple curve segments, and calculating a first approximate arc length of each curve segment and a second approximate arc length of the handwritten track curve.

In some embodiments, step 81 of dividing the handwritten track curve from the start point to the endpoint into multiple curve segments may include: dividing, based on the t-value, the handwritten track curve from the start point to the endpoint equally into two curve segments.

At step 82, calculating a difference between a sum of the first approximate arc lengths of the curve segments and the second approximate arc length of the handwritten track curve.

The difference between the sum of the first approximate arc lengths of the curve segments and the second approximate arc length of the handwritten track curve is represented by Error: Error=LL+LR−LT, where LL and LR are the first approximate arc lengths of the two curve segments obtained in step 81 respectively, and LT is the second approximate arc length of the handwritten track curve.

At step 83, in response to the difference being greater than or equal to the preset second threshold, for each curve segment, dividing each curve segment into multiple curve sub-segments until the difference between the sum of the first approximate arc lengths of the currently divided curve sub-segments and the second approximate arc length of the curve segment is less than the second threshold.

In the step, if Error≥the second threshold, which indicates that the current error is relatively large, and further recursive calculation is needed to acquire an accurate approximate arc length of the handwritten track curve.

At step 84, calculating the sum of the first approximate arc lengths of all current curve sub-segments to acquire the approximate arc length of the handwritten track curve from the start point to the endpoint.

In the step, the first approximate arc lengths of the curve sub-segments acquired when the recursion calculation stops are summed to acquire the approximate arc length of the handwritten track curve.

The process of calculating the approximate arc length of the handwritten track curve from the start point to the endpoint by using the Simpson algorithm and recursive integration idea will be illustrated in combination with the embodiment below.

The approximate arc length of the handwritten track curve from the start point to the endpoint is calculated by solving the above formula (5) through the Simpson algorithm.

$$\text{For the integral to be solved: } I = \int_a^b f(x)dx \qquad (9)$$

The handwritten track curve is divided into two curve segments based on the t-value, and the first approximate arc lengths LL and LR of the two curve segments are calculated according to formula (9), and the second approximate arc length LT of the handwritten track curve is calculated.

$$LL \text{ is calculated according to formula (10): } LL = \int_a^{mid} f(x)dx \quad (10)$$

$$LR \text{ is calculated according to formula (11): } LR = \int_{mid}^b f(x)dx \quad (11)$$

$$LT \text{ is calculated according to formula (12): } LT = \int_a^b f(x)dx \quad (12)$$

$$\text{where } a = 0, b = t, mid = \frac{a+b}{2}.$$

For LL, $$\text{let } a1 = a, b1 = mid, mid1 = \frac{a1+b1}{2}$$

according to formulas (10) to (12), the current recursive result may be calculated as: $LL_L'$, $LR_L'$, and $LT_L'$; $Error_L' = LL_L' + LR_L' - LT_L'$. If $Error_L' <$ the second threshold, which indicates that the current error is relatively small, so that the recursion calculation may stop, and the sum of $LL_L'$ and $LR_L'$ may be calculated as the value of LL. It should be noted that if $Error_L' \geq$ the second threshold, which indicates that the current error is relatively large, so that above recursion calculation continues, that is, by further dividing each of $LL_L'$ and $LR_L'$ into segments.

For LR, $$\text{let } a2 = mid, b2 = b, mid2 = \frac{a2+b2}{2},$$

the current recursive results may be calculated as: $LL_R'$, $LR_R'$, and $LT_R'$ according to formulas (10) to (12); $Error_R' = LL_R' + LR_R' - LT_R'$. If $Error_R'$ is less than the second threshold, wich indicates that the current error is relatively small, so that the recursion calculation stops, and the sum of $LL_R'$ and $LR_R'$ is calculated as the value of LR. It should be noted that if $Error_R' \geq$ the second threshold, which indicates that the current error is relatively large, so that above recursion calculation continues, that is, by further dividing LLR' and LRR' into segments.

The first approximate arc lengths of the curve subsegments acquired when the recursion calculation stops are summed to acquire the approximate arc length of the handwritten track curve L(1)=LLL'+LRL'+LLR'+LRR'.

In some embodiments, the handwritten of the marker pen can include multiple stroke segments, and correspondingly, the handwritten track can also include multiple track segments, each stroke segment being generated in sequence according to the arrangement order of each track segment.

Within the approximate arc length L(1) of the handwritten track curve, the calculation of the t-value for the interpolation point on the handwritten track curve by using the Newton iterative algorithm may include: in response to the arc length S from the current interpolation point to be interpolated to the first sampling point on the handwritten track curve is greater than the approximate arc length L(1) of the handwritten track curve and the current stroke segment is not the last stroke segment of the handwritten stroke, the interpolation point immediately before the current interpolation point to be interpolated serves as the first sampling point on the handwritten track of the next stroke segment. That is to say, in the process of generating the track segment of the marker pen corresponding to the stroke segment, if the stroke segment is not the last stroke segment of the handwritten stroke (i.e. the stroke segment is not the ending stroke segment with other stroke segment existing after the stroke segment) and the current interpolation point to be interpolated is outside the current stroke segment, which indicates that the approximate arc length from the interpolation point immediately before the current interpolation point to be interpolated to the last sampling point in the current stroke segment is less than the arc length τ between interpolation points, so that the current interpolation point to be interpolated is discarded, the interpolation point immediately before the current interpolation point to be interpolated serves as the last interpolation point of the current stroke segment, and replace the first sampling point of the next stroke segment. Therefore, the arc length from the interpolation point immediately before the current interpolation point to be interpolated in the current stroke segment to the last sampling point in the stroke track segment is discarded, thereby ensuring equal arc length interpolation can be realized.

It should be noted that if the arc length S from the current interpolation point to be interpolated to the first sampling point in the handwritten track curve is greater than the approximate arc length L(1) of the handwritten track curve and the current stroke segment is the last stroke segment of the handwritten stroke (i.e. the ending stroke segment), then interpolation process is performed on the interpolation point to be interpolated. That is, the arc length from the interpolation point immediately before the current interpolation point to be interpolated to the last sampling point in the stroke segment is retained rather than discarded.

In some embodiments, the track of the marker pen may include a plurality of track segments, and correspondingly, the handwritten stroke may also include a plurality of stroke segments. The plurality of track segments are generated in sequence according to the order of the plurality of stroke segments.

After calculating the approximate arc length L(1) of the handwritten track curve, for each interpolation point, within the approximate arc length L(1) of the handwritten track curve, before the t-value for the interpolation point on the handwritten track curve is calculated by using the Newton iterative algorithm, the handwriting generation method may further include: calculating the approximate number P of the interpolation points based on the approximate arc length L(1) of the handwritten track curve and the arc length r between interpolation points; and rounding down (i.e., taking an integer smaller than the calculated result when the calculated result is not an integer) the approximate number P of the interpolation points to acquire the number P' of the interpolation points. Correspondingly, for each interpolation point, within the approximate arc length L(1) of the handwritten track curve, calculation of the t-value for the interpolation point on the handwritten track curve by using the Newton iterative algorithm may include: in response to the current interpolation point to be interpolated is the $P'^{th}$ interpolation point and the current stroke segment is not the last stroke segment of the handwritten stroke, the $P'^{th}$ interpolation point serves as the first sampling point on the handwritten track of the next stroke segment. That is to say, in the process of generating the track segment of the marker pen corresponding to one stroke segment, if the stroke segment is not the last stroke segment of the handwritten stroke (i.e. the stroke segment is not the ending stroke segment with other stroke segment existing after the stroke segment), the number of interpolation points P' in the stroke segment is calculated first of all, and the number of interpolation points P' is acquired through a downward rounding operation. Since the $P'^{th}$ interpolation point serves as the first sampling point on the handwritten track of the next stroke segment, the arc length from the $P'^{th}$ interpolation point on the current stroke segment to the last sampling point on the current stroke segment is actually discarded, thereby ensuring the equal arc length interpolation can be realized.

In some embodiments, step 2 of determining the arc length τ between interpolation points may include: determining the arc length τ between interpolation points based on a coefficient M and a brush parameter, where the brush parameter includes a size of a brush which is a diameter of a brush-shaped outer circle.

In some embodiments, the arc length τ between interpolation points may be calculated according to formula (13):

$$\tau = M * d \tag{13}$$

where M is the coefficient, and d is the diameter of the brush-shaped outer circle.

In some embodiments, the coefficient is determined based on a density of the brush set by the user. The denser the brush, the smaller the coefficient is, and the smaller the density of the brush, the greater the coefficient is.

In some embodiments, the parameter of the brush may include the shape of the brush. FIG. 9 shows four shapes of the brush such as circular, square, bird's nest, and quasi-circular, and the size of the brush increases in sequence from left to right. Assuming that the density of the circular brush set by the user is the minimum and the density of the quasi-circular brush set by the user is the maximum, the coefficient corresponding to the circular brush is the largest (i.e., M=2) and the coefficient corresponding to the quasi-circular brush is the lowest (i.e., M=0.05).

In the embodiment of the present disclosure, the interpolation points are selected according to the equal arc length interpolation, and the transparency parameters are added at least at the positions of the interpolation point, so as to achieve an effect of the track of the marker pen. As shown in FIG. 11a to FIG. 11c, FIG. 11a is a schematic diagram showing a handwritten track. FIG. 11b is a schematic diagram showing the handwritten track, on which the interpolation points are selected by using the equal arc length interpolation, with no handwriting effect parameters overlaid. FIG. 11c is a schematic diagram showing an effect of track of the marker pen with the transparency applied. As shown in FIG. 11c, after the transparency is applied to the interpolation points selected according to the equal arc length interpolation, the resulting effect of the track of the marker pen has a darker color at the position where the strokes overlap each other, thereby realistically presenting the writing effect of the marker pen.

The handwriting generation method in the embodiment of the present disclosure selects the interpolation points according to the equal arc length interpolation, and attaches markers at the positions of the interpolation points, thereby simulating the style of the marker pen on the drawing board and flexibly achieving various styles of the marker pen such as various shapes, colors, thicknesses, and transparency. The embodiments of the present disclosure can be applied in the field of large-scale (generally over 50 inches) intelligent display, such as conference whiteboards and teaching whiteboards, to mark handwritten text, images, tables, and other contents on the whiteboard with the effect of the marker pen. The marking has the transparent characteristic of the marker pen, does not cover the original content, and is more suitable for demonstration, display, and other scenarios. On this basis, personalized presentation effects such as patterns, colors, and thicknesses of the strokes may also be applied based on user's choice.

Based on the same technical concept, an embodiment of the present disclosure further provides a handwriting generation device for generating a track of a marker pen based on a handwritten stroke. The track of the marker pen includes at least one track segment. As shown in FIG. 12, the data cache device includes a handwriting generation module 101, a first process module 102, a second process module 103, and a track generation module 104. The track generation module 104 is an application layer module, and the handwriting generation module 101, the first process module 102, and the second process module 103 are algorithm modules.

The handwriting generation module 101 is configured to acquire the sampling points on the handwritten track, and generate a handwritten track curve based on the sampling points. The handwritten track is a track of a stroke segment of the handwritten stroke.

The first process module 102 is configured to determine the arc length τ between interpolation points.

The second process module 103 is configured to calculate the arc length r between interpolation points, determine positions of the interpolation points on the handwritten track curve, where an arc length between two adjacent interpolation points on the handwritten track curve is the same as the arc length τ between interpolation points.

The track generation module 104 is configured to apply track effect parameters at the positions of the interpolation points to generate the track of the marker pen corresponding to the handwritten track curve.

In some embodiments, the handwriting generation module 101 is configured to generate the handwritten track curve according to the Bezier curve algorithm.

The second process module 103 is configured to determine the positions of interpolation points on the handwritten track curve by using an iterative algorithm.

(Claim 3) As shown in FIG. 13, the second process module 103 includes an interpolation point t-value calculation unit 1031 and an interpolation point position determination unit 1032. The interpolation point t-value calculation unit 1031 is configured to calculate the t-value of each interpolation point on the handwritten track curve by using an iterative algorithm for each interpolation point, where t is a parameter proportion of the Bezier curve. The approximate arc length $L(t_{j+1})$ on the handwritten track curve corresponding to the iterative value $t_{j+1}$ of t-value converges with respect to the arc length S from the interpolation point to the first sampling point on the handwritten track curve, the arc length S is a multiple of the arc length τ between interpolation points.

The interpolation point position determination unit 1032 is configured to determine the positions of the interpolation points on the handwritten track curve by using the Bezier curve algorithm according to the t-values of the interpolation points on the handwritten track curve.

In some embodiments, as shown in FIG. 14, the second process module 103 further includes an approximate arc length calculation unit 1033, which is configured to calculate the approximate arc length L(1) of the handwritten track curve.

The interpolation point t-value calculation unit 1031 is configured to calculate the t-value of each interpolation point on the handwritten track curve by using an iterative algorithm within the approximate arc length L(1) of the handwritten track curve for each interpolation point.

In some embodiments, the interpolation point t-value calculation unit 1031 is configured to calculate the t-value of each interpolation point on the handwritten track curve by: calculating an initial t-value $t_0$ of the interpolation point; calculating the approximate arc length $L(t_0)$ on the handwritten track curve corresponding to the initial t-value $t_0$; calculating an absolute value of a difference between the arc length S from the interpolation point to the first sampling point on the handwritten track curve and the approximate arc length $L(t_0)$ on the handwritten track curve corresponding to the initial t-value $t_0$; iteratively calculating the t-value for the interpolation point by using the iterative algorithm in response to the absolute value being greater than the preset first threshold, until the absolute value of the difference between the arc length S from the interpolation point to the first sampling point on the handwritten track curve and the approximate arc length $L(t_0)$ on the handwritten track curve corresponding to the iterative value $t_{j+1}$ of the t-value is less than or equal to the first threshold, where (j+1) is the current number of iterations, and the iterative value $t_{j+1}$ of the t-value when the iteration stops is the t-value for the interpolation point.

In some embodiments, the interpolation point t-value calculation unit 1031 is configured to calculate the initial t-value $t_0$ for the interpolation point according to:

$$t_0 = \frac{S}{L(1)},$$

where L(1) is the approximate arc length of the handwritten track curve.

In some embodiments, the approximate arc length calculation unit 1033 is configured to calculate the approximate arc length $L(t_{j+1})$ on the handwritten track curve corresponding to the iterative value $t_{j+1}$ of the t-value by: calculating the approximate arc length L' of the iteration difference, where the approximate arc length L' of the iteration difference is the approximate arc length from the position on the handwritten track curve corresponding to the t-value $t_j$ before the iteration to the position on the handwritten track curve corresponding to the iterative value $t_{j+1}$ of the t-value acquired in the next iteration; and calculating the approximate arc length $L(t_{j+1})$ on the handwritten track curve corresponding to the iterative value $t_{j+1}$ of the t-value acquired in the next iteration, according to the approximate arc length L(ty) on the handwritten track curve corresponding to the t-value $t_j$ before the iteration and the approximate arc length $L(t_{j+1})$ of the iteration difference.

In some embodiments, the approximate arc length calculation unit 1033 is configured to calculate the approximate arc length by: determining the t-values for the start point and the endpoint of the handwritten track curve corresponding to the approximate arc length; and calculating the approximate arc length by using the Simpson algorithm based on the t-values for the start point and the endpoint. When the approximate arc length is the approximate arc length L(1) of the handwritten track curve, the t-value for the start point is 0, and the t-value for the endpoint is 1. When the approximate arc length is the approximate arc length $L(t_{j+1})$ on the handwritten track curve corresponding to the iterative value $t_{j+1}$ of t-value, the t-value for the start point is 0, and the t-value for the endpoint is the iterative value $t_{j+1}$ of the t-value. When the approximate arc length is the approximate arc length $L(t_0)$ on the handwritten track curve corresponding to the initial t-value $t_0$, the t-value for the start point is 0, and the t-value for the endpoint is the initial t-value to. When the approximate arc length is the approximate arc length L' of the iteration difference, the t-value for the start point is the t-value $t_j$ before the iteration, and the t-value for the endpoint is the iterative value $t_{j+1}$ of the t-value acquired in the next iteration.

In some embodiments, the approximate arc length calculation unit 1033 is configured to: divide the handwritten track curve between the start point and the endpoint into multiple curve segments, and calculate first approximate arc lengths of the curve segments and a second approximate arc length of the handwritten track curve; calculate a difference between a sum of the first approximate arc lengths of the curve segments and the second approximate arc length of the handwritten track curve; in response to the difference being greater than or equal to the preset second threshold, divide each curve segment into multiple curve sub-segments until a difference between a sum of first approximate arc lengths of the curve sub-segments currently divided from each curve segment and a second approximate arc length of the curve segment is less than the second threshold; and calculate the sum of the first approximate arc lengths of all curve sub-segments to acquire the approximate arc length of the handwritten track curve between the start point and the endpoint.

In some embodiments, the approximate arc length calculation unit 1033 is configured to divide the handwritten track curve between the start point and the endpoint into two curve segments based on the t-value.

In some embodiments, the track of the marker pen includes a plurality of track segments, the handwritten stroke includes a plurality of stroke segments, and plurality of track segments are generated in sequence according to the order of the plurality of stroke segments.

The interpolation point t-value calculation unit 1031 is configured to: taking an interpolation point immediately before the current interpolation point to be interpolated as the first sampling point of the handwritten track for the next stroke segment, in response to the arc length S between the current interpolation point to be interpolated and the first sampling point on the handwritten track curve is greater than the approximate arc length L(1) of the handwritten track curve and the current stroke segment is not the last stroke segment of the handwritten stroke.

In some embodiments, the track of the marker pen includes a plurality of track segments, the handwritten stroke includes a plurality of stroke segments, and the plurality of track segments are generated in sequence according to the order of the plurality of stroke segments.

After the approximate arc length calculation unit 1033 calculates the approximate arc length L(1) of the handwritten track curve, before the interpolation point t-value calculation unit 1031 calculates the t-value of the interpolation point on the handwritten track curve by using the iterative algorithm within the approximate arc length L(1) of the handwritten track curve, the interpolation point t-value calculation unit 1031 is further configured to serve the $P^{th}$ interpolation point as the first sampling point of the handwritten track for the next stroke segment in response to the current interpolation point to be interpolated is the $P^{th}$ interpolation point and the current track segment is not the last stroke segment of the handwritten stroke.

In some embodiments, the iterative algorithm is a Newton iterative algorithm.

In some embodiments, the first process module 102 is configured to determine the arc length τ between interpolation points based on a coefficient and a parameter of a brush. The parameter of the brush is a size of the brush.

In some embodiments, the coefficient is determined based on a density of the brush set by the user. The higher the density of the brush, the smaller the coefficient. The smaller the density of the brush, the greater the coefficient is.

In some embodiments, the handwriting generation module 101 is configured to acquire three sampling points on the handwritten track, and generate the handwritten track curve by using the Bezier curve algorithm according to the three sampling points, wherein the middle sampling point serves as the vertex, and the connection lines each connecting the middle sampling point to the two adjacent sampling points serve as two sides with an included angle formed between the two sides.

In the case where a first included angle is greater than a second included angle, the number of interpolation points on the first handwritten track curve is greater than the number of interpolation points on the second handwritten track curve. The first handwritten track curve is a handwritten track curve generated by using the Bezier curve algorithm according to three sampling points in the first group, and the first included angle is the included angle between the connection lines as two sides each connecting the middle sampling point, which serves as a vertex, to the two adjacent sampling points in the first group which are adjacent to the middle sampling point. The second handwritten track curve is a handwritten track curve generated by using the Bezier curve algorithm according to the three sampling points in the second group, and the second included angle is an included angle between the connection lines as two sides each connecting the middle sampling point, which serves as a vertex, to the two adjacent sampling points in the second group which are adjacent to the middle sampling point.

In some embodiments, the handwriting effect parameters include at least one of color, thickness, transparency, and pattern.

An embodiment of the present disclosure further provides a computer device, which includes: one or more processors and a storage device. The one or more programs are stored on the storage device, and when the one or more programs are run by the one or more processors, the one or more processors implement the handwriting generation method in any one of the embodiments described above.

The present disclosed embodiment further provides a computer-readable medium on which a computer program is stored, when the computer program is run, the handwriting generation method in any one of the embodiments described above can be realized.

It can be understood that the above embodiments are only exemplary embodiments adopted to illustrate the principles of the present disclosure/utility model. However, the present disclosure/utility model is not limited thereto. For those skilled in the art, various variations and improvements can be made without departing from the spirit and essence of the present disclosure/utility model, and these variations and improvements also fall in the protection scope of the present disclosure/utility model.

What is claimed is:

1. A method for generating handwriting, configured to generate a track of a marker pen according to a handwritten stroke, and the track of the marker pen comprising at least one track segment, wherein the method comprises:

acquiring sampling points on a handwritten track, and generating a handwritten track curve based on the sampling points, wherein the handwritten track is a track of a stroke segment of a handwritten stroke;

determining an arc length τ between interpolation points based on a coefficient and a parameter of a brush, wherein the arc length τ is an arc length between two adjacent interpolation points on the handwritten track curve;

determining positions of interpolation points on the handwritten track curve according to the arc length τ between interpolation points; and overlaying a handwriting effect parameter at the positions of the interpolation points to generate the track of the marker pen corresponding to the handwritten track curve-, wherein determining the positions of the interpolation points on the handwritten track curve according to the arc length τ between interpolation points, comprises:

for each interpolation point, calculating a t-value of each interpolation point on the handwritten track curve by using an iterative algorithm, wherein t is a parameter proportion of a Bezier curve, an approximate arc length $L(t_{j+1})$ on the handwritten track curve corresponding to an iterative value $t_{j+1}$ of the t-value converges with respect to an arc length S from the interpolation point to a first sampling point on the handwritten track curve, and the arc length S is a multiple of the arc length τ between interpolation points; and determining the positions of the interpolation points on the handwritten track curve by using the Bezier curve algorithm according to the t-values for the interpolation points on the handwritten track curve.

2. The method of claim 1, wherein generating the handwritten track curve based on the sampling points, comprises:

generating the handwritten track curve according to a Bezier curve algorithm.

3. The method of claim 1, wherein before calculating the t-value of each interpolation point on the handwritten track curve by using the iterative algorithm, the method further comprises: calculating an approximate arc length L(1) of the handwritten track curve; and for each interpolation point, calculating the t-value of each interpolation point on the handwritten track curve by using the iterative algorithm, comprises: for each interpolation point, within the approximate arc length L(1) of the handwritten track curve, calculating the t-value for each interpolation point on the handwritten track curve by using the iterative algorithm.

4. The method of claim 3, wherein calculating the t-value for each interpolation point on the handwritten track curve, comprises:

calculating an initial t-value to for the interpolation point;

calculating an approximate arc length $L(t_0)$ on the handwritten track curve corresponding to the initial t-value $t_0$;

calculating an absolute value of a difference between the arc length S from the interpolation point to the first sampling point on the handwritten track curve and the approximate arc length $L(t_0)$ on the handwritten track curve corresponding to the initial t-value to; and iteratively calculating the t-value for the interpolation point by using the iterative algorithm in response to the absolute value being greater than a preset first threshold, until the absolute value of the difference between the arc length S from the interpolation point to the first sampling point on the handwritten track curve and the approximate arc length $L(t_{j+1})$ on the handwritten track curve corresponding to the iterative value $t_{j+1}$ of the t-value is less than or equal to the first threshold, where (j+1) is a current number of iterations, and the iterative value $t_{j+1}$ of the t-value when the iteration stops is the t-value for the interpolation point.

5. The method of claim 4, wherein the initial t-value to for the interpolation point is calculated according to:

$$t_0 = \frac{S}{L(1)}$$

where $L(1)$ is the approximate arc length of the handwritten track curve.

6. The method of claim 4, wherein calculating the approximate arc length $L(t_{j+1})$ on the handwritten track curve corresponding to the iterative value $t_{j+1}$ of the t-value, comprises:

calculating an approximate arc length L' of an iteration difference, where the approximate arc length L' of the iteration difference is an approximate arc length from a position on the handwritten track curve corresponding to the t-value $t_j$ before the iteration to a position on the handwritten track curve corresponding to the iterative value $t_{j+1}$ of the t-value acquired in the next iteration; and calculating the approximate arc length $L(t_{j+1})$ on the handwritten track curve corresponding to the iterative value $t_{j+1}$ of the t-value acquired in the next iteration, according to an approximate arc length $L(t_j)$ on the handwritten track curve corresponding to the t-value $t_j$ before iteration and the approximate arc length L' of the iteration difference.

7. The method of claim 6, wherein calculating the approximate arc length, comprises:

determining the t-value for a start point and the t-value for an endpoint on the handwritten track curve corresponding to the approximate arc length; and calculating the approximate arc length by using a Simpson algorithm based on the t-value for the start point and the t-value for the endpoint;

wherein in response to the approximate arc length is the approximate arc length $L(1)$ of the handwritten track curve, the t-value for the start point is 0, and the t-value for the endpoint is 1; in response to that the approximate arc length is the approximate arc length L on the handwritten track curve corresponding to the iterative value $t_{j+1}$ of the t-value, the t-value for the start point is 0, and the t-value for the endpoint is the iterative value $t_{j+1}$ of the t-value; in response to the approximate arc length is the approximate arc length $L(t_0)$ on the handwritten track curve corresponding to the initial t-value to, the t-value for the start point is 0, and the t-value for the endpoint is the initial t-value to; in response to the approximate arc length is the approximate arc length L' of the iteration difference, the t-value for the start point is the t-value $t_j$ before iteration, and the t-value for the endpoint is the iterative value $t_{j+1}$ of the t-value acquired in the next iteration.

8. The method of claim 7, wherein calculating the approximate arc length of the handwritten track curve comprises:

dividing the handwritten track curve from the start point to the endpoint into multiple curve segments, and calculating first approximate arc lengths of the multiple curve segments and a second approximate arc length of the handwritten track curve;

calculating a difference between a sum of the first approximate arc lengths of the multiple curve segments and the second approximate arc length of the handwritten track curve;

for each curve segment, diving each of the multiple curve segments into multiple curve sub-segments in response to the difference being greater than or equal to a preset second threshold, until the difference between the sum of the first approximate arc lengths of the currently divided curve sub-segments of a corresponding curve segment and the second approximate arc lengths of the corresponding curve segment is less than the second threshold; and calculating the sum of the first approximate arc lengths of all current curve sub-segments to acquire the approximate arc length of the handwritten track curve from the start point to the endpoint.

9. The method of claim 8, wherein dividing the handwritten track curve into the multiple curve segments, comprises:

dividing the handwritten track curve from the start point to the endpoint into multiple curve segments based on the t-value.

10. The method of claim 3, wherein the track of the marker pen comprises a plurality of track segments, the handwritten stroke comprises a plurality of stroke segments, and the plurality of track segments are generated in sequence according to the order of the plurality of stroke segments;

within the approximate arc length $L(1)$ of the handwritten track curve, calculating the t-value for the interpolation point on the handwritten track curve by using the iterative algorithm, comprises:

taking an interpolation point immediately before the current interpolation point to be interpolated as the first sampling point on the handwritten track for the the next stroke segment, in response to the arc length S from the current interpolation point to be interpolated to the first sampling point on the handwritten track curve is greater than the approximate arc length $L(1)$ of the handwritten track curve and the current stroke segment is not the last stroke segment of the handwritten stroke.

11. The method of claim 3, wherein the track of the marker pen comprises a plurality of track segments, the handwritten stroke comprises a plurality of stroke segments, and the plurality of track segments are generated in sequence according to the order of the plurality of stroke segments wherein after calculating the approximate arc length $L(1)$ of the handwritten track curve, and before calculating the t-value for the interpolation point on the handwritten track curve by using the iterative algorithm within the approximate arc length $L(1)$ of the handwritten track curve, the method comprises:

calculating an approximate number P of the interpolation points according to the approximate arc length $L(1)$ of the handwritten track curve and the arc length $\tau$ between interpolation points, and rounding down the approximate number P of the interpolation points to acquire a number P' of the interpolation points; and wherein for each interpolation point, within the approximate arc length $L(1)$ of the handwritten track curve, calculating the t-value for the interpolation point on the handwritten track curve by using the iterative algorithm, comprises:

taking a $P'^{th}$ interpolation point as the first sampling point of the handwritten track for the next stroke segment, in response to the current interpolation point to be interpolated is the $P^{tth}$ interpolation point and the current stroke segment is not the last stroke segment of the handwritten stroke.

12. The method of any one of claim 2, wherein the iterative algorithm is a Newton iterative algorithm.

13. The method of claim 1, wherein the parameter of the brush comprises a size of the brush.

14. The method of claim 13, wherein the coefficient is determined based on a density of the brush set by the user, the higher the density of the brush, the smaller the coefficient, and the smaller the density of the brush, the greater the coefficient.

15. The method of claim 2, wherein generating the handwritten track curve according to a Bezier curve algorithm, comprises:

acquiring three sampling points on the handwritten track, and generating the handwritten track curve by using the Bezier curve algorithm according to the three sampling points, wherein the middle sampling point of the three sampling points serves as a vertex, connection lines each connecting the middle sampling point to the two sampling points adjacent to the middle sampling point serve as two sides with an included angle formed between the two sides; and wherein a number of interpolation points on the first handwritten track curve is greater than a number of interpolation points on the second handwritten track curve, in response to a first included angle is greater than a second included angle;

the first handwritten track curve is a handwritten track curve generated by using the Bezier curve algorithm according to three sampling points in a first group, and the first included angle is an included angle formed by taking the middle sampling point of the three sampling points in the first group as a vertex and taking the connection lines each connecting the middle sampling point to the two sampling points adjacent to the middle sampling point as two sides; and the second handwritten track curve is a handwritten track curve generated by using the Bezier curve algorithm according to three sampling points in a second group, and the second included angle is an included angle formed by taking the middle sampling point of the three sampling points in the second group as a vertex and taking the connection lines each connecting the middle sampling point to the two sampling points adjacent to the middle sampling point as two sides.

16. The method of any one of claim 1, wherein the handwriting effect parameter comprises at least one of color, thickness, transparency, and pattern.

17. A handwriting generation device configured to generate a track of a marker pen based on a handwritten stroke, the track of the marker pen comprises at least one track segment, and the handwriting generation device comprises a handwriting generation module, a first process module, a second process module, and a track generation module;

the handwriting generation module is configured to acquire sampling points on a handwritten track and generate a handwritten track curve based on the sampling points, wherein the handwritten track is a track of a stroke segment in the handwritten stroke;

the first process module is configured to determine an arc length $\tau$ between interpolation points based on a coefficient and a parameter of a brush, wherein the arc length $\tau$ is an arc length between two adjacent interpolation points on the handwritten track curve;

the second process module is configured to determine positions of the interpolation points on the handwritten track curve according to the arc length $\tau$ between interpolation points; and the track generation module is configured to overlay a handwriting effect parameter at the positions of the interpolation points to generate the track of the marker pen corresponding to the handwritten track curve, the second process module is further configured to:

for each interpolation point, calculate a t-value of each interpolation point on the handwritten track curve by using an iterative algorithm, wherein t is a parameter proportion of a Bezier curve, an approximate arc length $L(t_{j+1})$ on the handwritten track curve corresponding to an iterative value $t_{j+1}$ of the t-value converges with respect to an arc length S from the interpolation point to a first sampling point on the handwritten track curve, and the arc length S is a multiple of the arc length $\tau$ between interpolation points; and determine the positions of the interpolation points on the handwritten track curve by using the Bezier curve algorithm according to the t-values for the interpolation points on the handwritten track curve.

18. A computer device, comprising:

one or more processors;

a storage device on which one or more programs are stored;

the one or more programs, when being run by the one or more processors, are configured to cause the one or more processor to perform the method for generating handwriting of claim 1.

19. A non-transitory computer-readable medium on which a computer program is stored, wherein the program is executed to implement the method for generating handwriting of claim 1.

* * * * *